N. A. PALMGREN.
ROLLER BEARING.
APPLICATION FILED DEC. 16, 1919.

1,350,263.

Patented Aug. 17, 1920.

INVENTOR:
Nils Arvid Palmgren
By Attorneys,

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,350,263. Specification of Letters Patent. Patented Aug. 17, 1920.

Application filed December 16, 1919. Serial No. 345,321.

*To all whom it may concern:*

Be it known that I, NILS ARVID PALMGREN, a subject of the King of Sweden, residing at Gottenborg, in the Kingdom of Sweden, have invented a new and useful Improvement in Roller-Bearings, of which the following is a specification.

The present invention relates to a roller bearing which is provided with two rows of rollers, which have an outwardly curved rolling surface, so that the rollers are barrel-shaped, and the outer race of which bearing is provided on its inner side with a spherical rolling surface for both rows of rollers. In roller bearings of this type as heretotfore used the rollers are so shaped that there is so-called point contact at both races, that is to say, the contact between the roller and each rolling surface is concentrated into a point or in any case to a very small portion of the length of the roller. The result will be, however, that every deviation from the normal direction of the forces acting on the roller will cause a tipping of the roller to one side, the roller either becoming forced hard against the roller retainer, if any, in the bearing, causing much friction between the roller and the retainer, or the pressure on the roller from the races becoming increased in a very high degree endangering the life and duration of the bearing. Such deviations from the normal direction of the forces acting upon the roller will easily take place at such moments when the bearing is subjected to a shock load, and particularly, when a radial roller bearing is subjected to axial shocks.

The purpose of the present invention is to avoid the said inconvenience and to render tipping of the rollers impossible, or at least less apt to occur. To this end the invention provides that the rollers have such shape that they bear against one of the rolling surfaces, or both rolling surfaces, of the races along their entire length, or at least along the greater portion of their length, that is to say, they have so-called line contact with one of the rolling surfaces or with both rolling surfaces of the races. This avoids the tendency to tipping or angular displacement of the rollers.

The rollers may have such shape that the tangents to the rollers in the axial plane of the bearing at the points through which the resultants of the forces acting upon the roller from the rolling surfaces of the two races pass, are parallel, or such shape that the said tangents converge on or in the vicinity of the axis of rotation of the bearing. In the first instance the rollers will roll substantially as cylinders, whereas in the second instance they will roll substantially as cones.

In the accompanaying drawing a few embodiments of the invention are shown by way of example, in axial sections.

Figure 1:
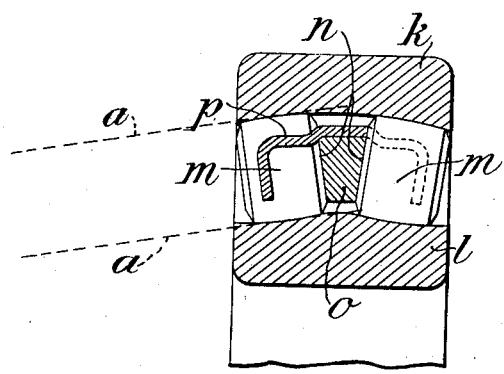
Figure 1 is an axial section of the bearing containing one embodiment of the invention.

The roller bearing shown in Fig. 1 is provided with an outer race $k$ and an inner race $l$, each race being made in one piece. Between said races two rows of barrel-shaped rollers $m$ are provided, said rollers bearing against the races along their entire length in such manner that the resultants of the forces through the rollers form acute angles with the axis of rotation of the bearing, so that the bearing may take up thrusts in both directions. In this instance the rollers are so shaped that the tangents in the axial plane of the bearing to the rollers at the middle points of their lines of contact with the races are parallel, as shown by lines $a$—$a$ so that the rollers will roll substantially as cylinders.

The outer race $k$ is provided on the inner side with a spherical track or rolling surface common to both rows of rollers. In this manner the bearing becomes self-adjusting, the inner race $l$ with the rollers $m$ being capable of turning into any position relatively to the outer race $k$. In this embodiment the end surfaces $n$ of the rollers directed toward the central plane of the bearing perpendicular to the axis are plane and have chamfered edges.

A ring $o$ is inserted between both rows of rollers, said ring preventing the rollers from occupying an oblique position, that is to say, from turning around a line through the middle points of the two lines of contact with the races. The rollers are separated and prevented from dropping out of the bearing, if the outer race is turned sidewise or removed, by a roller retainer $p$ consisting of a ring-shaped plate provided with tongues projecting to both sides in between the rollers.

Figure 2:
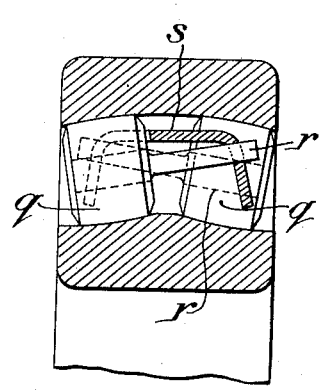
Fig. 2 is a similar section according to another embodiment.

The bearing illustrated in Fig. 2 is substantially similar to that shown in Fig. 1. The rollers $q$ are provided with studs $r$ which may be rigidly secured in the rollers, or the studs may be formed integral with the rollers. The ends of said studs farthest from the rollers are fitted into holes in a roller retainer $s$ in such manner that the studs on the rollers of one row project in between the rollers of the other row. By this arrangement a more accurate guiding of the rollers in their tracks is obtained. The studs may turn with the rollers, or they may be made fast to the retainer $s$, so that the rollers turn on the studs.

Figure 3:
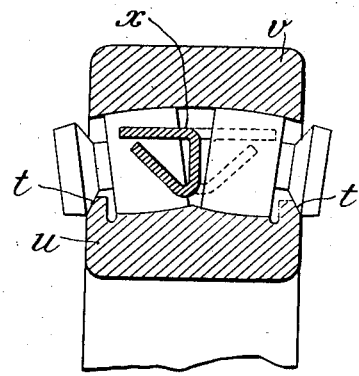
Fig. 3 is a similar section illustrating a third embodiment.

Fig. 3 illustrates a third bearing according to the invention. This bearing also is a two-row bearing, is self-adjusting and may withstand thrusts in both directions and has line contact between the rollers and both races. For counteracting the tendency of the rollers to be displaced toward the central plane perpendicular to the axis of the bearing, each of the rollers is provided with a flange $t$ bearing against the inner race $u$. This bearing also has a spherically shaped track for the rollers on the inside of the outer race $v$, and a roller retainer $x$ is inserted in the bearing in the ordinary manner for maintaining the rollers at the proper distances from one another in the rolling direction.

When the rollers are supported by a ring placed between the rows of rollers, as in Fig. 1, they may also be shaped in other manner than that shown in Fig. 1. The guide ring may either be loose, as in Fig. 1, or it may be rigidly connected with one of the races or form a portion of the roller retainer. The surfaces of the guide ring directed toward the rollers may also be shaped in other manner than that shown in Fig. 1. Depending upon the various shapes of the ends of the rollers and of the guide ring, either surface contact, or line contact, or point contact will be obtained between the rollers and the ring.

The rollers may also be guided by a stud or journal rigidly secured to the roller and journaled in the roller retainer as shown in Fig. 2, or by a journal or stud inserted in the roller retainer on which stud the roller is journaled. It will be understood that the rollers, roller retainer, races, and guide rings may also be otherwise shaped and arranged in different ways in respect of their details.

In addition to the advantages above pointed out the described embodiments of the present invention also possess the advantage that the bearings may be made with the rollers close to one another, and each of the races may be made in one piece, without necessitating any filling opening for introducing the rollers into the bearing.

I make no claim herein to the guide ring being rigidly connected with one of the races, as this is claimed in my application Serial No. 364,385, filed March 9, 1920, which is in effect a division of this present application in that it sets forth and claims barrel shaped rollers which roll effectively as cones instead of as cylinders, which matter has been erased from the present application.

I claim:

1. In a roller bearing, the combination of an inner race, an outer race having a spherical rolling surface for the rollers, and two rows of rollers between said races, the axes of the rollers of the respective rows converging in cones having their axes on the bearing axis at opposite sides of the bearing, each of said rollers having an outwardly curved rolling surface of such shape that it bears against at least one of the rolling surfaces of said races along the greater portion of the length of the roller.

2. In a roller bearing, the combination of an inner race, an outer race having a spherical rolling surface for the rollers, and two rows of rollers between said races, the axes of the rollers of the respective rows converging in cones having their axes on the bearing axis at opposite sides of the bearing, each of said rollers having an outwardly curved rolling surface of such shape that it bears against at least one of the rolling surfaces of said races along the greater portion of the length of the roller and that the tangents to the roller in the axial plane of the bearing at the points through which the resultants of forces acting on the roller from the rolling surfaces of said races pass are parallel so that the roller rolls substantially as a cylinder.

3. A roller bearing according to claim 1, having a ring between the two rows of rollers adapted to receive the end thrusts of the rollers directed toward the central plane perpendicular to the axis of the bearing.

4. A roller bearing according to claim 1, having a roller retainer between the rows of rollers, said retainer having projections entering between and engaging the rollers of each row to hold the rollers against angular displacement.

5. A roller bearing according to claim 1, having a thrust ring between the rows of rollers, and having a roller retainer engaging said ring having portions engaging the rollers to prevent angular displacement thereof.

NILS ARVID PALMGREN.